(12) United States Patent
La Porte

(10) Patent No.: US 11,904,965 B1
(45) Date of Patent: Feb. 20, 2024

(54) BICYCLE BRAKE LOCK

(71) Applicant: Ronald La Porte, Bronx, NY (US)

(72) Inventor: Ronald La Porte, Bronx, NY (US)

( * ) Notice: Subject to any disclaimer, the term of this patent is extended or adjusted under 35 U.S.C. 154(b) by 339 days.

(21) Appl. No.: 17/223,101

(22) Filed: Apr. 6, 2021

(51) Int. Cl.
*B62H 5/18* (2006.01)
*B62L 3/06* (2006.01)
*B62L 1/00* (2006.01)
*E05B 47/00* (2006.01)

(52) U.S. Cl.
CPC ............... *B62H 5/18* (2013.01); *B62L 1/00* (2013.01); *B62L 3/06* (2013.01); *E05B 47/0004* (2013.01)

(58) Field of Classification Search
CPC .. B62H 5/18; B62H 5/141; B62L 1/00; B62L 1/005; B62L 1/02; B62L 3/06; B62L 3/023; E05B 47/004; E05B 67/36; E05B 15/102; B60T 17/00; B60T 13/748; B60T 13/741; B60T 8/3225; B60T 7/085; B60T 1/005; E05C 19/184; Y10T 70/441; Y10T 70/5841; Y10T 70/498; Y10T 70/585; Y10T 70/573; Y10T 70/5872; Y10T 70/5743; Y10T 70/5845; Y10T 70/5889; Y10T 70/5765; F16D 27/02; F16D 27/14; F16D 2027/002; B62K 21/02; B62K 19/38
USPC ....................................................... 188/24.11
See application file for complete search history.

(56) References Cited

U.S. PATENT DOCUMENTS

| | | | |
|---|---|---|---|
| 3,652,103 A * | 3/1972 | Higgs .................. | B62B 5/0423 70/226 |
| 5,530,427 A * | 6/1996 | Shieh .................. | B60R 25/1001 70/228 |
| 8,228,668 B2 | 7/2012 | Assamarai | |
| D761,238 S | 7/2016 | Ann | |
| 10,619,789 B1 | 4/2020 | Copeland | |
| 2002/0083746 A1* | 7/2002 | Cleveland .......... | G07C 9/00182 70/233 |
| 2005/0236530 A1 | 10/2005 | Weatherly | |
| 2008/0053766 A1* | 3/2008 | Costa ................. | B62H 5/18 188/344 |
| 2009/0173117 A1* | 7/2009 | Xavier ................. | E05C 19/184 70/228 |
| 2011/0079687 A1 | 4/2011 | Grove | |
| 2012/0318619 A1* | 12/2012 | Cooper, II ........... | B60T 7/16 188/24.11 |
| 2015/0048224 A1 | 2/2015 | Patterson | |
| 2019/0344754 A1* | 11/2019 | Kolb .................... | H04W 12/06 |
| 2019/0347881 A1* | 11/2019 | Kolb .................... | G07C 9/00182 |
| 2019/0371097 A1* | 12/2019 | Kolb .................... | E05B 67/063 |
| 2020/0108882 A1* | 4/2020 | Weigel ................. | B62M 6/45 |

FOREIGN PATENT DOCUMENTS

CA 2461984 9/2004

\* cited by examiner

*Primary Examiner* — Robert A. Siconolfi
*Assistant Examiner* — San M Aung
(74) *Attorney, Agent, or Firm* — Kyle A. Fletcher, Esq.

(57) ABSTRACT

The bicycle brake lock comprises a cycle, a locking structure, and a personal data device. The cycle is defined elsewhere in this disclosure. The locking structure locks the disk brake system of the cycle such that the cycle cannot roll over a supporting surface. The personal data device controls the operation of the locking structure.

13 Claims, 6 Drawing Sheets

BICYCLE BRAKE LOCK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including cycles, more specifically, a lock integral with the cycle preventing wheel rotation through the braking device. (B62H5/18)

SUMMARY OF INVENTION

The bicycle brake lock comprises a cycle, a locking structure, and a personal data device. The cycle is defined elsewhere in this disclosure. The cycle further comprises a disk brake system. The locking structure locks the disk brake system of the cycle such that the cycle cannot roll over a supporting surface. The personal data device controls the operation of the locking structure.

These together with additional objects, features and advantages of the bicycle brake lock will be readily apparent to those of ordinary skill in the art upon reading the following detailed description of the presently preferred, but nonetheless illustrative, embodiments when taken in conjunction with the accompanying drawings.

In this respect, before explaining the current embodiments of the bicycle brake lock in detail, it is to be understood that the bicycle brake lock is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bicycle brake lock.

It is therefore important that the claims be regarded as including such equivalent construction insofar as they do not depart from the spirit and scope of the bicycle brake lock. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
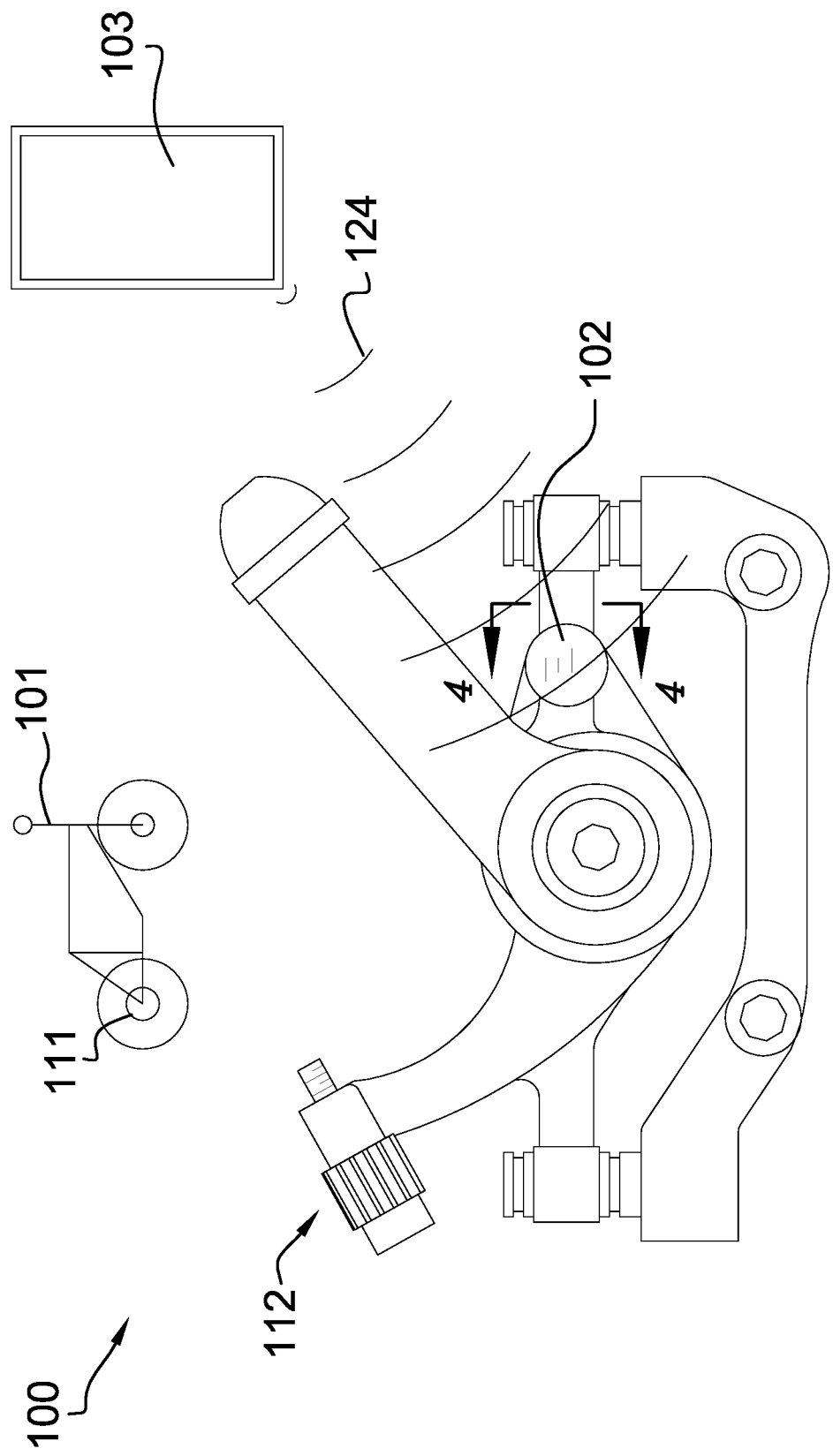
FIG. 1 is a front view of an embodiment of the disclosure.
Figure 2:
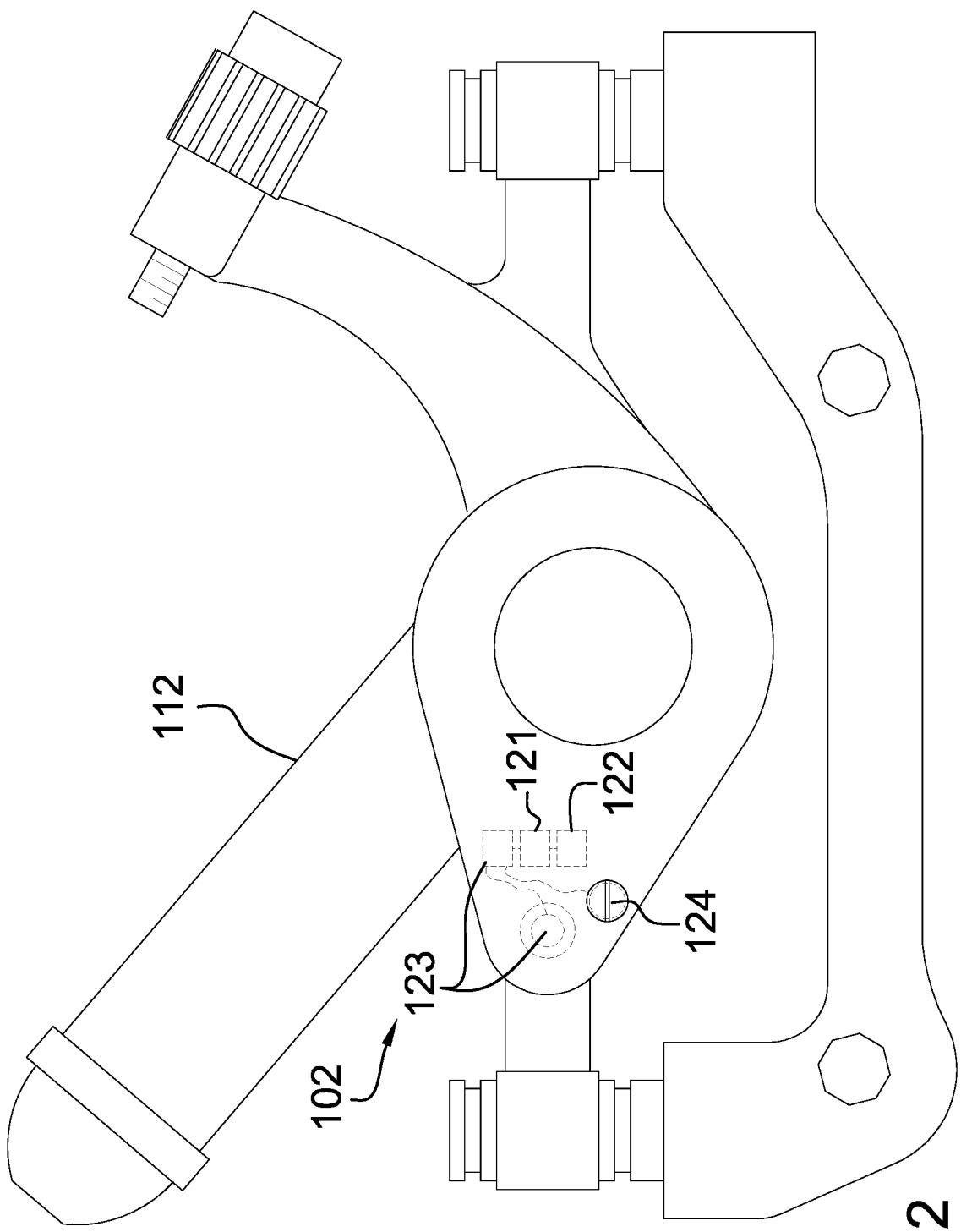
FIG. 2 is a reverse view of an embodiment of the disclosure.
Figure 3:
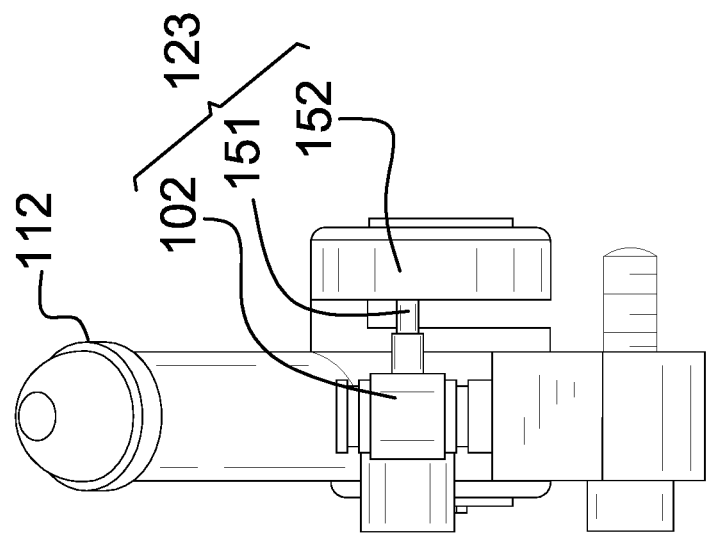
FIG. 3 is a side view of an embodiment of the disclosure.
Figure 4:
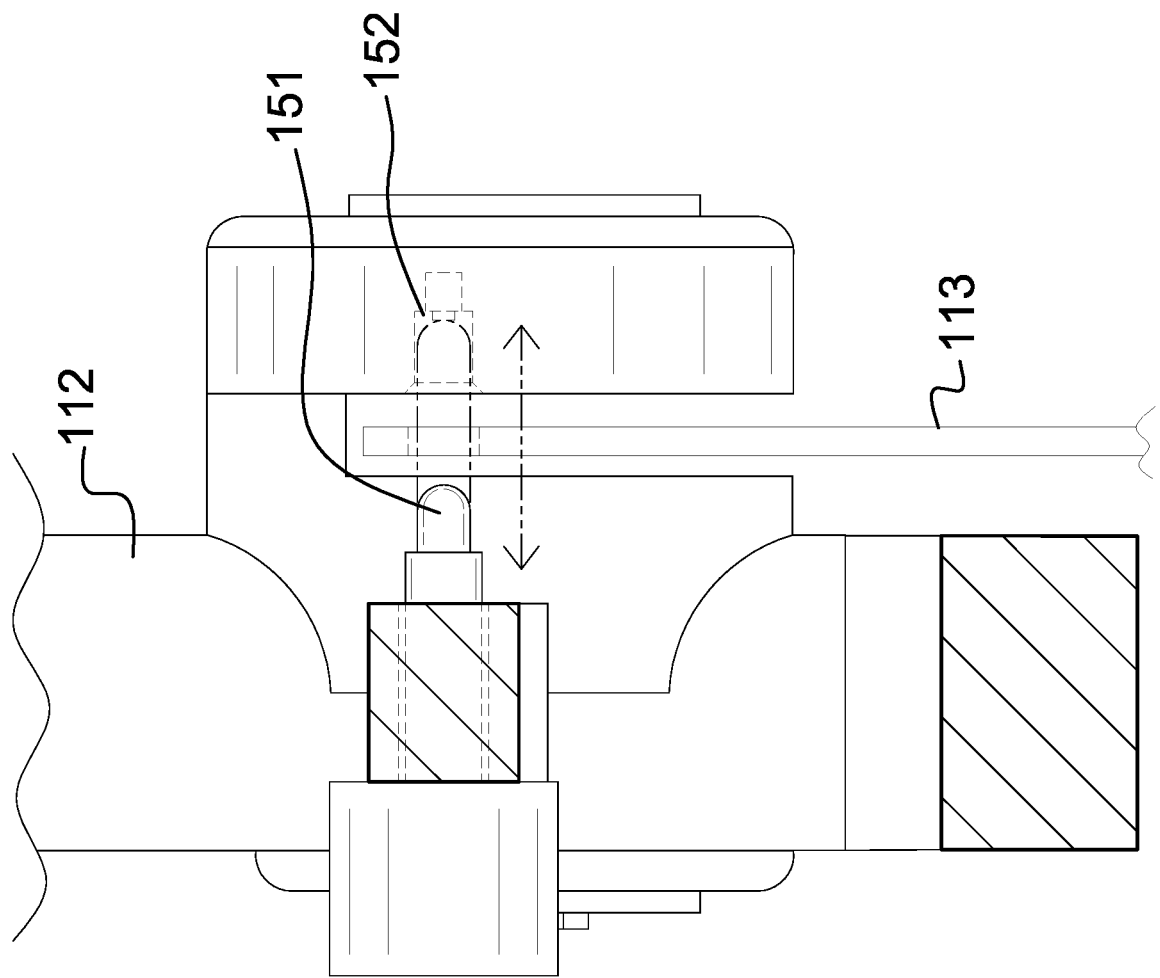
FIG. 4 is a cross-sectional view of an embodiment of the disclosure.
Figure 5:
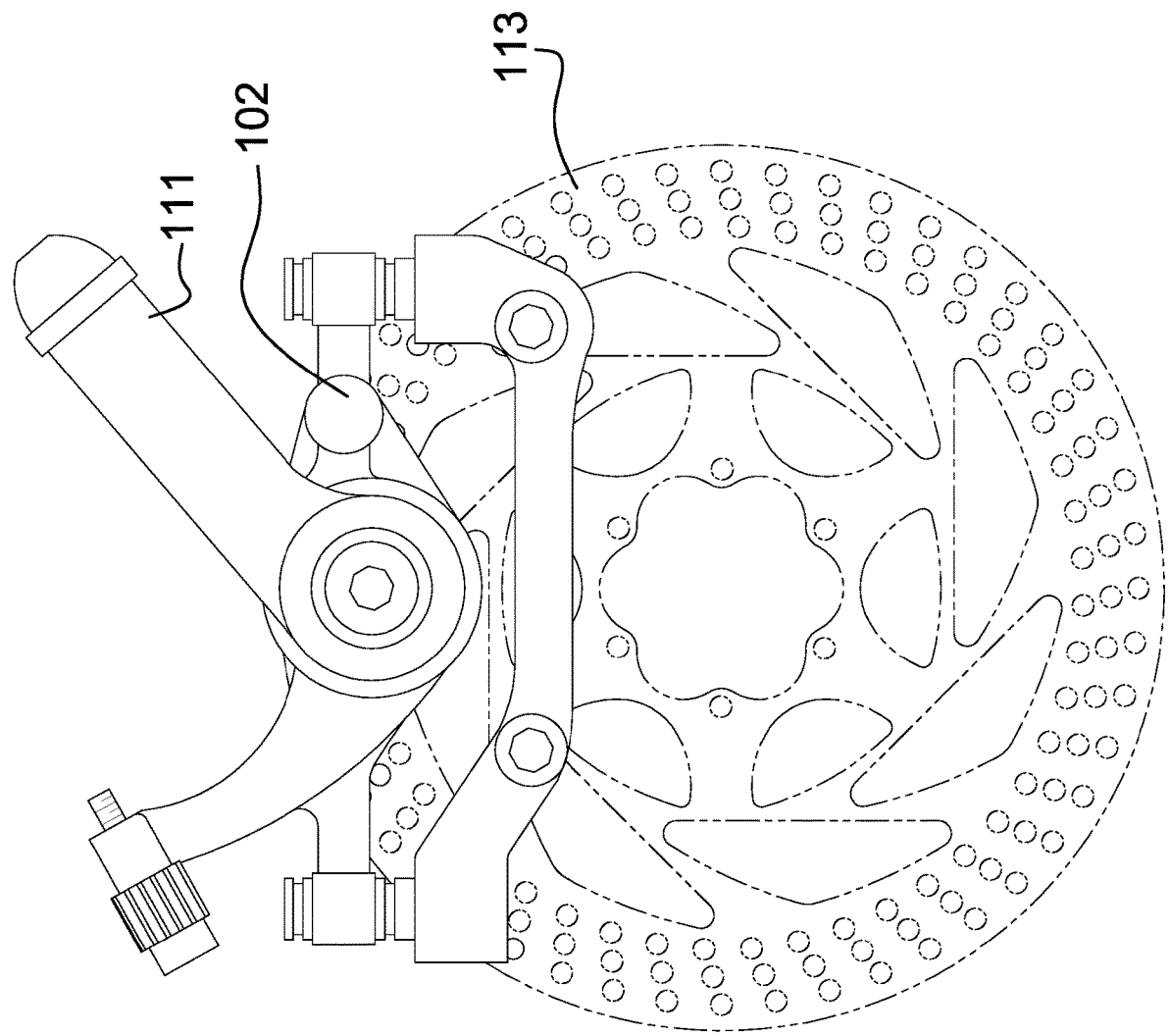
FIG. 5 is a detail view of an embodiment of the disclosure.
Figure 6:
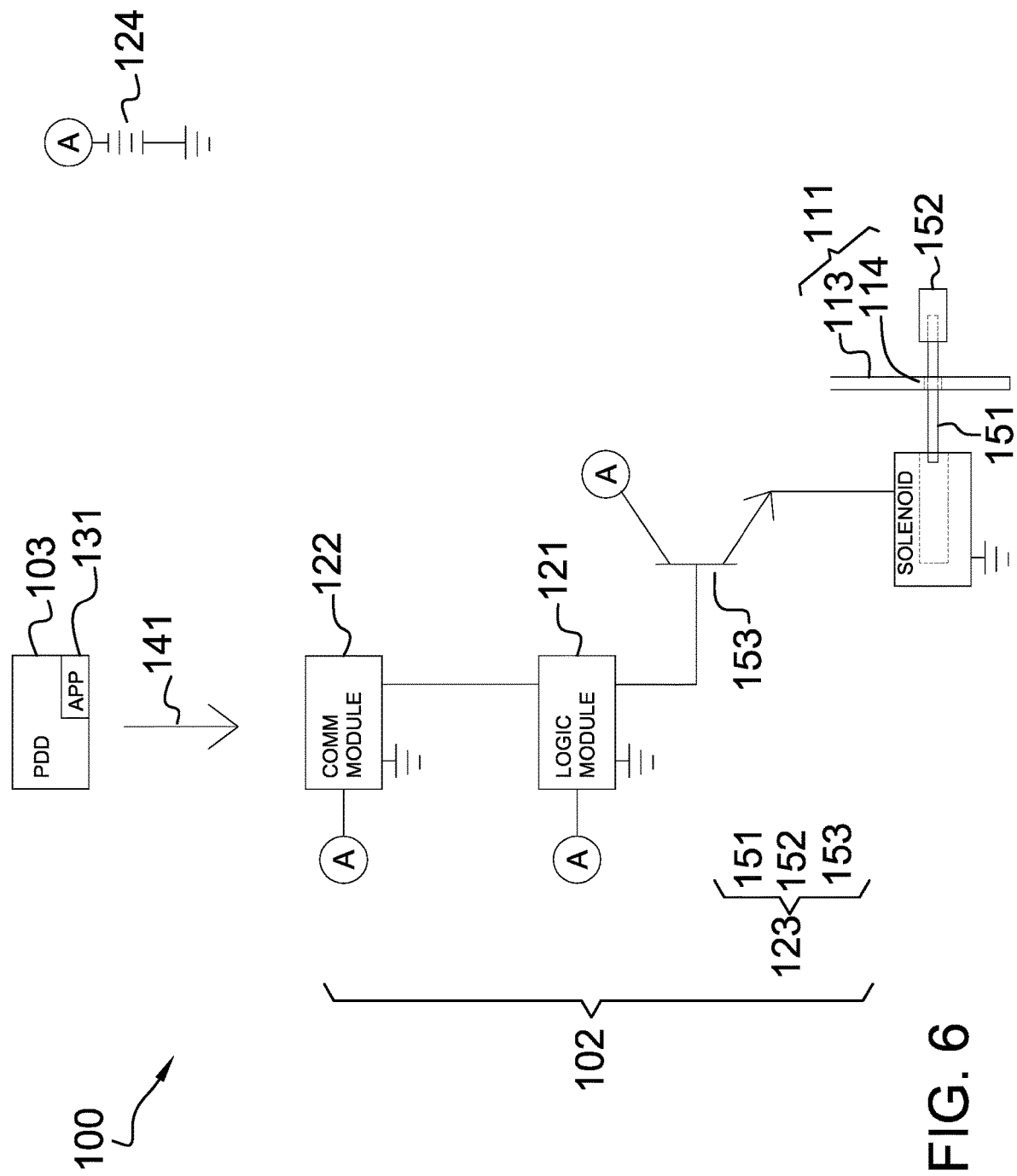
FIG. 6 is a schematic view of an embodiment of the disclosure.

Detailed reference will now be made to one or more potential embodiments of the disclosure, which are illustrated in FIGS. 1 through 6.

The bicycle brake lock 100 (hereinafter invention) comprises a cycle 101, a locking structure 102, and a personal data device 103. The cycle 101 is defined elsewhere in this disclosure. The cycle 101 further comprises a disk brake system 111. The locking structure 102 mounts on the cycle 101. The locking structure 102 locks the disk brake system 111 of the cycle 101 such that the cycle 101 cannot roll over a supporting surface. The personal data device 103 controls the operation of the locking structure 102.

The cycle 101 is a vehicle. The cycle 101 is a two-wheeled structure. The cycle 101 is selected from the group consisting of a motorized vehicle and a non-motorized vehicle. The terms vehicle and cycle 101 are defined elsewhere in this disclosure. The cycle 101 comprises a disk brake system 111.

The disk brake system 111 is a device that is used to slow and stop the motion of the cycle 101. The terms brake and disk brake are defined elsewhere in this disclosure. The disk brake system 111 is a mechanical structure that inhibits the rotation of a wheel of the cycle 101. The locking structure 102 attaches to the disk brake system 111 such that the locking structure 102 can fix and release the position of the disk brake system 111 to prevent the cycle 101 from rolling over a supporting surface. The disk brake system 111 further comprises a caliper mount 112 and a brake disk 113. The brake disk 113 further comprises an aperture 114.

The caliper mount 112 is the caliper structure of the disk brake system 111. The caliper is defined elsewhere in this disclosure. The locking structure 102 mounts on the caliper mount 112 of the disk brake system 111. The brake disk 113 is the disk structure of the disk brake system 111. The caliper mount 112 and the disk of a disk brake system 111 are defined elsewhere in this disclosure. The locking structure 102 inserts a locking plug 151 through the aperture 114 formed in the brake disk 113 to prevent the rotation of the brake disk 113 from rotating relative to the caliper mount 112. The aperture 114 is a negative space that is formed through the faces of the disk structure of the brake disk 113. The locking plug 151 of the locking structure 102 inserts through the aperture 114 to form a physical barrier that prevents the brake disk 113 from rotating relative to the caliper mount 112.

The locking structure 102 is an electromechanical structure. The locking structure 102 is an electrically powered device. The locking structure 102 attaches to the caliper mount 112 of the disk brake system 111 of the cycle 101. The locking structure 102 fixes the position of the brake disk 113 relative to the caliper mount 112. By fixing the position is meant that the locking structure 102 prevents the brake disk 113 from rotating relative to the caliper mount 112. The locking structure 102 comprises a logic module 121, a communication module 122, a locking solenoid 123, and a battery 124. The communication module 122 further comprises a wireless communication link 141. The logic module 121, the communication module 122, the locking solenoid 123 and the battery 124 are electrically interconnected. The wireless communication link 141 forms a communication link with the personal data device 103.

The battery 124 is an electrochemical device. The battery 124 converts chemical potential energy into the electrical energy used to operate the locking structure 102. The battery 124 is defined elsewhere in this disclosure.

The logic module 121 is a readily and commercially available programmable electronic device that is used to manage, regulate, and operate the locking structure 102. The communication module 122 is a wireless electronic communication device that allows the logic module 121 to wirelessly communicate with a locally presented device such as a personal data device 103. Specifically, the communication module 122 establishes a wireless communication link 141 between the locking structure 102 and the personal data device 103. The communication module 122 receives operating instructions to lock and unlock the disk brake system 111 over the wireless communication link 141 from the personal data device 103. The communication module 122 transmits the received operating instructions to the logic module 121 for implementation. In the first potential embodiment of the disclosure, the communication module 122 supports a communication protocol selected from the group consisting of a WiFi™ protocol or a Bluetooth™ protocol.

The locking solenoid 123 is an electromagnetic device. The locking solenoid 123 is an electrically operated device. The locking solenoid 123 is electrically powered. The locking solenoid 123 is defined elsewhere in this disclosure. The logic module 121 controls the operation of the locking solenoid 123. The locking solenoid 123 further comprises a locking plug 151, a locking cavity 152, and a locking solenoid 123 relay 153.

The locking solenoid 123 generates a magnetic field that moves the position of the locking plug 151 relative to the brake disk 113 of the disk brake system 111. The locking solenoid 123 is aligned with the aperture 114 of the brake disk 113 such that the locking plug 151 inserts through the aperture 114 into the locking cavity 152 of the locking solenoid 123. The insertion of the locking plug 151 through the aperture 114 forms a physical barrier that prevents the brake disk 113 from rotating relative to the caliper mount 112.

The locking plug 151 is a prism-shaped shaft structure. The locking plug 151 forms a shaft that is inserted through the aperture 114 of the brake disk 113. The insertion of the locking plug 151 through the aperture 114 blocks the rotation of the brake disk 113 relative to the caliper mount 112. The locking plug 151 is formed from a magnetic material that allows the magnetic coils of the locking solenoid 123 to move the locking plug 151.

The locking cavity 152 is a negative space that is sized to receive the free end of the locking plug 151 after the insertion of the locking plug 151 through the aperture 114 of the brake disk 113. The locking cavity 152 holds the locking plug 151 in a fixed position such that the locking cavity 152 braces the locking plug 151 to prevent locking plug 151 from shifting while the locking solenoid 123 is locking the brake disk 113 into a fixed position relative to the caliper mount 112.

The locking solenoid 123 relay 153 is an electrically controlled switching device. The logic module 121 electrically controls the operation of the locking solenoid 123 relay 153. The locking solenoid 123 relay 153 controls the flow of electricity from the battery 124 into the locking solenoid 123. The logic module 121 controls the position of the locking plug 151 relative to the brake disk 113 by using the locking solenoid 123 relay 153 to control the flow of electricity into the locking solenoid 123. In the first potential embodiment of the disclosure, the locking solenoid 123 relay 153 is a transistor.

The personal data device 103 is a programmable electrical device. The personal data device 103 further comprises an application 131. The personal data device 103 provides data management and communication services through one or more functions referred to as an application 131. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts. The application 131 of the personal data device 103 forms an interface with the locking structure 102. The personal data device 103 transmits operating instructions to lock and unlock the disk brake system 111 over the wireless communication link 141 to the locking structure 102. The communication module 122 receives the transmitted operating instructions and relays the received operating instructions to the logic module 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Brake: As used in this disclosure, a brake is a device that is used to slow or stop the motion of a machine or a vehicle.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clamp: As used in this disclosure, a clamp refers to a structure that temporarily fastens to the one or more faces of one or more prism structures. The clamp is used: a) to attach an externally provisioned object to the lateral face of a prism structure; or, b) to press a first face of a first prism to a second face of a second prism.

Communication Link: As used in this disclosure, a communication link refers to the structured exchange of data between two objects.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cycle: As used in this disclosure, a cycle refers to a two wheeled vehicle such as a bicycle and a motorcycle. In commonly used variations, a three wheeled vehicle is referred to as a tricycle. A one wheeled vehicle used to transport a person is referred to as a unicycle.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Disk Brake: As used in this disclosure, a disk brake is a device used to slow or stop the motion of a rotating element of a machine or a vehicle. The disk brake is an indirect braking system. By indirect braking system is meant that instead of directly braking the motion of the rotating element, the disk brake stops the rotation of the rotating element by stopping the rotation of a disk-shaped structure. The disk-shaped structure is attached to the rotating element such that the axes of rotations of the disk-shaped structure and the rotating element are aligned. By stopping the rotation of the disk-shaped structure, the disk brake stops the rotation of the rotating element. A disk brake system comprises the disk-shaped structure, a caliper, and a piston. The caliper further comprises a clamp and a plurality of pads. The clamp clamps onto the faces of the disk structure. The friction of the caliper against the disk structure slows and halts the rotation of the disk-shaped structure and the attached rotating element. The plurality of pads are sacrificial structures that are positioned between the clamp and the disk-shaped structure such that each of the plurality of pads are damaged by the friction generated by the braking process instead of the clamp of the caliper. The piston is a mechanical structure that controls the position of the caliper relative to the disk-shaped structure. The piston: a) presses the caliper against the faces of the disk-shaped structure; and, b) pulls the caliper away from the faces of the disk-shaped structure. The motion of the piston is powered by externally provided motive forces such as those provided through: a) hydraulic cylinder and piston systems; and, b) mechanical linkage systems.

Form Factor: As used in this disclosure, the term form factor refers to the size and shape of an object.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hydraulic: As used in this disclosure, hydraulic refers to a device wherein the movement of the device is powered using a fluid under pressure. The terms pneumatic and hydraulic can be used interchangeably.

Hydraulic Cylinder: As used in this disclosure, a hydraulic cylinder is a telescopic composite prism structure comprising an outer cylinder (or other tubular prism structure) and a matching piston structure. The piston structure mounts in the outer cylinder such that the position of the piston structure within the outer cylinder structure of the hydraulic cylinder is adjustable. The combination of the outer cylinder and the piston structure forms a reservoir within the hydraulic cylinder that contains a fluid, referred to as a hydraulic fluid. The reservoir forms a variable containment volume structure. The pressure of the hydraulic fluid contained within the reservoir varies as a function of the containment volume of the hydraulic cylinder. This arrangement allows for the adjustment of the piston position by applying an external force to change the pressure of the hydraulic fluid contained in the reservoir. Alternately, the pressure of the hydraulic fluid in the reservoir can be adjusted applying an external force to change the position of the piston structure within the outer cylinder.

Interlock: As used in this disclosure, an interlock is a second mechanism that enables and disables the operation of a first mechanism. Generally, an interlock is used as a safety or security device.

Lock: As used in this disclosure, a lock is a releasable fastening device that secures a rotating mechanical device into a fixed position.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Mechanical Linkage: As used in this disclosure, a mechanical linkage is an interconnected arrangement of components that are used to manage the transfer of a movement or a force. A mechanical linkage is often referred to as a linkage.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Piston: As used in this disclosure, a piston is a prism, disk, or shaft that fits closely in a housing and that moves along its center axis Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relay: As used in this disclosure, a relay is an automatic electronic, electromagnetic or electromechanical device that reacts to changes in voltage or current by opening or closing a switch in an electric circuit. Relays are further defined with a coil and a switch. Applying a voltage to the coil, usually referred to as energizing the coil, will cause the coil to change the position of the switch. This definition is not intended to preclude the substitution of a transistor for a relay. Within this disclosure, a transistor can be considered as a relay. In this scenario, the base voltage is analogous to the coil of the relay and the current flow from the collector to the emitter is analogous to the operation of the switch of the relay. Those skilled in the electrical arts will recognize that this substitution can be made without undue experimentation. The transistor is defined in greater detail elsewhere in this disclosure.

Rotation: As used in this disclosure, rotation refers to the cyclic movement of an object around a fixed point or fixed axis. The verb of rotation is to rotate.

Sacrificial Material: As used in this disclosure, a sacrificial material is a material that protects a first object or structure from damage. More specifically, the sacrificial material protects the second object or structure by being damaged during use of the second object or structure.

Sacrificial Structure: As used in this disclosure, a sacrificial structure is a first object or structure that protects a second object or structure from damage. More specifically, the sacrificial structure protects the second object or Solenoid: As used in this disclosure, a solenoid is a cylindrical coil of electrical wire that generates a magnetic field that can be used to mechanically move a shaft made of a magnetic core.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Transistor: As used in this disclosure, a transistor is a general term for a three terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bicycle brake lock comprising
a cycle, a locking structure, and a personal data device;
wherein the locking structure mounts on the cycle;
wherein the personal data device controls the operation of the locking structure;
wherein the cycle further comprises a disk brake system;
wherein the disk brake system further comprises a caliper mount and a brake disk;
wherein the brake disk further comprises an aperture;
wherein the locking structure inserts a locking plug through the aperture formed in the brake disk to prevent the rotation of the brake disk from rotating relative to the caliper mount;
wherein the aperture is a negative space that is formed through the faces of the disk structure of the brake disk;
wherein the locking plug of the locking structure inserts through the aperture to form a physical barrier that prevents the brake disk from rotating relative to the caliper mount;
wherein the locking structure comprises a logic module, a communication module, a locking solenoid, and a battery;
wherein the communication module further comprises a wireless communication link;
wherein the wireless communication link forms a communication link with the personal data device;
wherein the communication module receives operating instructions to lock and unlock the disk brake system over the wireless communication link from the personal data device;
wherein the communication module transmits the received operating instructions to the logic module for implementation;
wherein the locking structure is an electromechanical structure;
wherein the locking structure is an electrically powered device;
wherein the locking structure mounts on the caliper mount of the disk brake system;
wherein the locking structure fixes the position of the brake disk relative to the caliper mount;
wherein by fixing the position is meant that the locking structure prevents the brake disk from rotating relative to the caliper mount;
wherein the personal data device transmits operating instructions to lock and unlock the disk brake system to the locking structure;
wherein the locking solenoid further comprises the locking plug, a locking cavity, and a locking solenoid relay;
wherein the locking plug inserts into the locking cavity;
wherein the locking solenoid relay controls the motion of the locking plug;
wherein the logic module controls the operation of the locking solenoid relay.

2. The bicycle brake lock according to claim 1
wherein the disk brake system is a device that is used to slow and stop the motion of the cycle;
wherein the disk brake system is a mechanical structure that inhibits the rotation of a wheel of the cycle.

3. The bicycle brake lock according to claim 2 wherein the locking structure attaches to the disk brake system such that the locking structure can fix and release the position of the disk brake system to prevent the cycle from rolling over a supporting surface.

4. The bicycle brake lock according to claim 3
wherein the cycle is a vehicle;
wherein the cycle is a two-wheeled structure;
wherein the caliper mount is the caliper structure of the disk brake system;
wherein the brake disk is the disk structure of the disk brake system.

5. The bicycle brake lock according to claim 4
wherein the personal data device is a programmable electrical device;
wherein the personal data device further comprises an application;

wherein the application of the personal data device forms an interface with the locking structure.

6. The bicycle brake lock according to claim 5
wherein the battery is an electrochemical device;
wherein the battery converts chemical potential energy into the electrical energy used to operate the locking structure.

7. The bicycle brake lock according to claim 6
wherein the logic module programmable electronic device;
wherein the communication module is a wireless electronic communication device;
wherein the communication module establishes a wireless communication link between the locking structure and the personal data device.

8. The bicycle brake lock according to claim 7
wherein the locking solenoid is an electromagnetic device;
wherein the locking solenoid is an electrically operated device;
wherein the locking solenoid is electrically powered.

9. The bicycle brake lock according to claim 8 wherein the logic module controls the operation of the locking solenoid.

10. The bicycle brake lock according to claim 9
wherein the locking solenoid generates a magnetic field that moves the position of the locking plug relative to the brake disk of the disk brake system;
wherein the locking solenoid is aligned with the aperture of the brake disk such that the locking plug inserts through the aperture into the locking cavity of the locking solenoid;
wherein the insertion of the locking plug through the aperture forms a physical barrier that prevents the brake disk from rotating relative to the caliper mount.

11. The bicycle brake lock according to claim 10
wherein the locking plug forms a shaft that is inserted through the aperture of the brake disk;
wherein the insertion of the locking plug through the aperture blocks the rotation of the brake disk relative to the caliper mount;
wherein the locking plug is formed from a magnetic material that allows the magnetic coils of the locking solenoid to move the locking plug.

12. The bicycle brake lock according to claim 11
wherein the locking cavity is a negative space that is sized to receive the free end of the locking plug after the insertion of the locking plug through the aperture of the brake disk;
wherein the locking cavity holds the locking plug in a fixed position such that the locking cavity braces the locking plug to prevent the locking plug from shifting while the locking solenoid is locking the brake disk into a fixed position relative to the caliper mount.

13. The bicycle brake lock according to claim 12
wherein the locking solenoid relay is an electrically controlled switching device;
wherein the logic module electrically controls the operation of the locking solenoid relay;
wherein the locking solenoid relay controls the flow of electricity from the battery into the locking solenoid;
wherein the logic module controls the position of the locking plug relative to the brake disk by using the locking solenoid relay to control the flow of electricity into the locking solenoid.

\* \* \* \* \*